United States Patent [19]
Cordier et al.

[11] 4,299,602
[45] Nov. 10, 1981

[54] DEVICE FOR WASHING A POLLUTED GAS AND INSTALLATION EQUIPPED WITH SUCH A DEVICE

[75] Inventors: André Cordier, Montrouge; Benoît de Metz-Noblat, Pont a Mousson, both of France

[73] Assignee: Air Industrie, Courbevoie, France

[21] Appl. No.: 148,743

[22] Filed: May 12, 1980

[30] Foreign Application Priority Data

May 17, 1979 [FR] France .................. 79 12604

[51] Int. Cl.³ .......................................... B01D 47/12
[52] U.S. Cl. ............................ 55/240; 55/DIG. 46; 98/115.5 B; 118/326; 118/DIG. 7; 261/112
[58] Field of Search .................. 55/240, 241, DIG. 46; 261/112, 118, DIG. 54; 98/115 SB; 118/326, DIG. 7

[56] References Cited

U.S. PATENT DOCUMENTS

| | | | |
|---|---|---|---|
| 2,568,875 | 9/1951 | Wethly et al. | 261/118 |
| 3,934,495 | 1/1976 | Bloomer | 261/112 |
| 4,045,524 | 8/1977 | Bornert | 261/DIG. 54 |
| 4,057,602 | 11/1977 | Kolm | 261/DIG. 54 |
| 4,220,078 | 9/1980 | Walker et al. | 55/240 |

*Primary Examiner*—David L. Lacey
*Attorney, Agent, or Firm*—Larson and Taylor

[57] ABSTRACT

A washing device is provided which comprises at least one inclined wall or floor defining at least one orifice therein, means for causing a washing liquid to flow over the upper side of this wall, means for causing the polluted gas to flow from top to bottom of the device, at least one transverse wall situated below the orifice, and a flow channel having a vertical (or substantially vertical) axis surrounding the transverse wall. This device further comprises a connecting channel whose upper end terminates at the orifice, which has a downwardly divergent shape, and whose lower end is connected to the flow channel.

10 Claims, 7 Drawing Figures

DEVICE FOR WASHING A POLLUTED GAS AND INSTALLATION EQUIPPED WITH SUCH A DEVICE

The invention relates to devices for washing a polluted gas, of the kind in which the polluted gas is forced to pass through at least one curtain of washing liquid.

The invention concerns more particularly, because it is in this case that its application seems to present most interest, but not exclusively, devices for washing a polluted gas containing solid and/or liquid particles in suspension which must be eliminated, particularly fine particles of paint in the air (paint mist) which occur in painting cabins and, in particular, the painting cabins used in the motor industry for painting vehicle bodies.

Devices for washing a polluted gas are already known which comprise at least one sloping wall or washing surface, hereinafter referred to as a streaming wall, wherein the upper side is wet, means for causing a washing liquid to stream or flow over the wet side of this wall and means for causing the polluted gas to flow from top to bottom.

In a device of this type, the curtain formed by the washing liquid breaks away from the lower edge of the streaming wall and is projected into the polluted gas to be atomized and to collect mechanically and/or chemically the impurities polluting said gas; in particular, when the gas is a gas containing solid and/or liquid particles in suspension, said particles are collected mechanically by the curtain of washing liquid. The efficiency of this collection depends on the continuous character of the curtain of washing liquid and it will be readily understood that gaps in this curtain cause a lowering of collecting efficiency, since the polluted gas which passes through these gaps is not subjected to washing.

It has been proposed in known installations to make the streaming wall emerge above a transverse wall having a continuous or discontinuous contour similar to (equal to or, preferably, larger than) the continuous or discontinuous contour of the lower end of said streaming channel. Thus, the streaming water impacts this transverse wall where it is deflected before falling into the receiving tank below. With this transverse wall, a continuous curtain of washing liquid of specific dimensions can be obtained.

However, this construction sometimes presents a disadvantage in the case where the purified air is extracted laterally, which is generally the case. Under these conditions, the washing liquid is subjected to atomization by impact when it strikes the transverse wall and small drops of washing liquid are carried along with the purified air.

This is why it has been proposed, in known installations of this type, to surround the transverse wall with a flow control or streaming channel opening both upwards and downwards. This open streaming channel only ensures however a very poor reduction in the droplets carried along by the purified air for the finest droplets produced by impact on the transverse wall are carried along by the purified air towards the upper opening of the streaming channel. It is moreover because of this disadvantage that an additional baffle device is required to ensure collection of the droplets of water before the purified air is extracted.

The aim of the present invention is therefore to remedy the above-mentioned disadvantages while retaining, and even improving the advantages of known devices and in particular their efficiency.

The device for washing a polluted gas in accordance with the invention comprises at least one streaming wall defining at least one flow orifice therein, hereinafter referred to as a through-orifice, means for causing a washing liquid to stream over the upper side of this streaming wall, means for causing the polluted gas to flow from top to bottom, at least one transverse wall situated below the flow-orifice, and a streaming channel having a vertical (or substantially vertical) axis surrounding the transverse wall, and is characterized in that there is provided, for creating a sealed connection between the streaming channel and the streaming wall, a connecting channel whose upper end ends in the through-orifice, which has a divergent shape turned downwards, and whose lower end is connected to the streaming channel.

Due to the sealed connection between the streaming channel and the streaming wall and to the action of the transverse wall surrounded by the streaming channel, the washing liquid is directed wholly towards the bottom of the device. Thus, the droplets of liquid formed on impact against the transverse wall are necessarily collected by the curtain of liquid formed between this transverse wall and the streaming channel, these droplets having to pass through this curtain before leaving the washing device. It is therefore no longer necessary to associate with the streaming channel an additional baffle device.

Moreover, because of the divergent shape of the connecting channel, the speed of the polluted gas is reduced from that when flowing through the through-orifice provided in the streaming wall. This reduction in speed reduces the number of droplets carried along, and even prevents droplets which are below the streaming channel from being carried along.

Furthermore, the device of the invention eliminates practically any risk of fouling the lower side of the streaming wall; because of this, maintenance of the device is greatly facilitated because of the poor accessibility of the lower side of this streaming wall.

According to one embodiment of the invention, the streaming wall has, in the vicinity of its through-orifice, a conical part with a downwardly converging shape and ending at said through-orifice.

According to another embodiment of the invention, the streaming wall has, in the vicinity of its through-orifice, a cylindrical part whose lower end forms said through-orifice.

The invention will, in any case, be well understood with the complement of description which follows as well as the accompanying drawings, which complement and the drawings are directed to preferred embodiments of the invention and are, of course, non-limiting.

Figure 1:
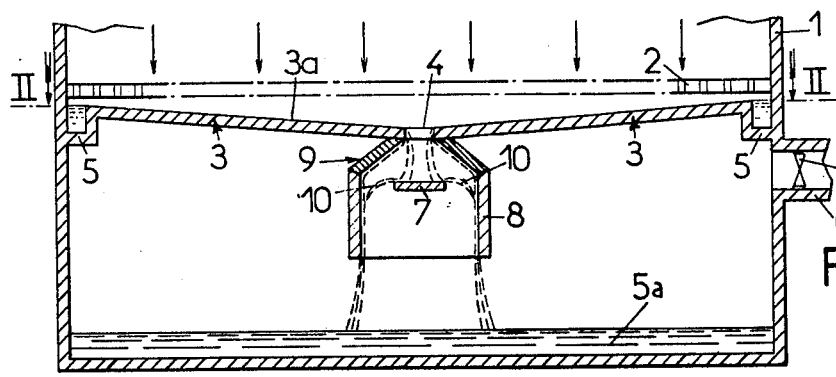
FIG. 1 is a general schematical sectional view of a painting cabin equipped with a washing device in accordance with the invention.
Figure 2:
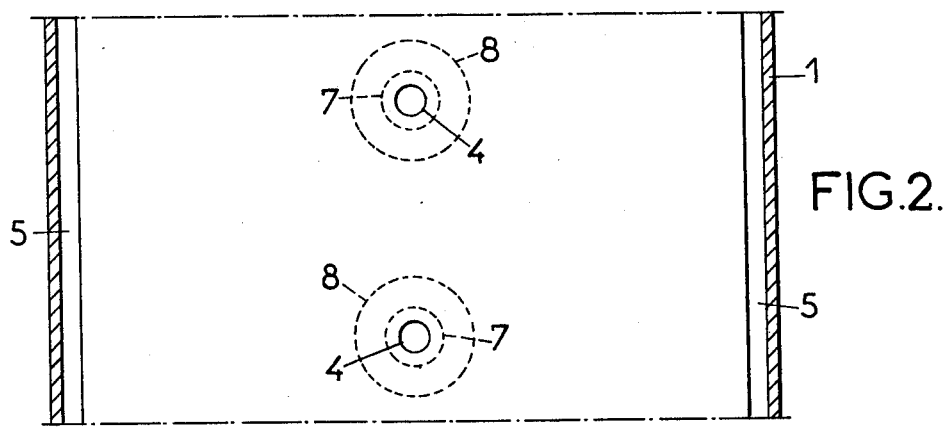
FIG. 2 is a section along II—II of FIG. 1.
Figure 3:
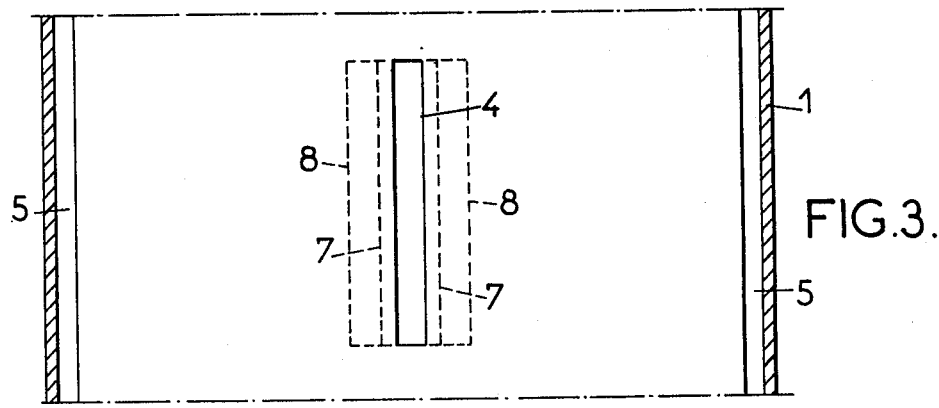
FIG. 3 is a variation of the painting cabin shown in FIGS. 1 and 2, this variation being shown in a section similar to that of FIG. 2.

In FIGS. 1 to 3 there is shown a painting cabin comprising an enclosure 1, a perforated floor 2 and streaming walls 3.

These streaming walls 3 define at least one through-orifice 4 towards which they convey a washing liquid, under the action of appropriate means.

These means are arranged to cause the washing liquid to stream over the upper side 3a of each streaming wall 3, and they may be formed by overflow channels 5 spilling over the upper side 3a of said streaming walls 3.

Once the washing liquid has passed through the washing device, it is collected in a receiving tank 5a.

Means for causing the polluted gas to flow from top to bottom are then provided, and these means may for example be formed by at least one fan 6 for sucking out the gas after it has passed through the washing device; this fan 6 may be disposed in a duct 6a which extends from the part of enclosure 1 situated below the streaming walls 3.

A transverse wall 7 is situated below orifice 4, such a transverse wall being able to be constructed as described in French patent Application No. 73 09949 filed on Mar. 20, 1973 and published as French Pat. No. 2 222 120, corresponding to U.S. Pat. No. 4,045,524.

A streaming channel 8 with a vertical or substantially vertical axis is disposed so as to surround this transverse wall 7.

Sealed connecting means 9 are provided between this streaming channel 8 and streaming wall 3. These sealed connecting means 9 are formed by a connecting channel whose upper end terminates at the through-orifice 4, which has a downwardly divergent shape, and whose lower end is connected to streaming channel 8.

Insofar as the geometry of such a washing device is concerned, recourse may be had,

- to a circular geometry such as shown in FIG. 2 (through-orifice 4, transverse wall 7, streaming channel 8 and connecting means 9, circular in shape),
- or to a rectangular geometry such as shown in FIG. 3 (through-orifice 4, transverse wall 7, streaming channel 8 and connecting means 9, having a rectangular shape).

With such a washing device, sealing is then obtained between the streaming channel 8 and streaming wall 3; the mist of droplets which forms above the transverse wall 7 can only be discharged downwards and, therefore, it is forced to pass through the curtain of liquid 10 existing between transverse wall 7 and streaming channel 8. These droplets are therefore collected and cannot be carried along by the gas extracted from the painting cabin.

Furthermore, the speed of the polluted gas is reduced in the divergent means formed by the connecting channel, which reduces the number of droplets carried along, or even prevents these droplets from being carried along.

Furthermore, the lower side 3b of streaming wall 3 (not wetted by the washing liquid) is not in contact with the polluted gas and cannot therefore be fouled.

Figure 4:
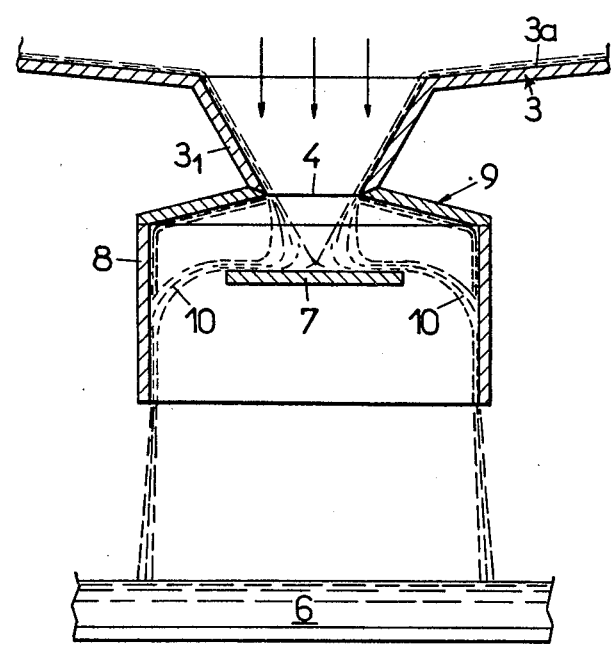
FIGS. 4 to 6 show washing devices constructed in accordance with advantageous embodiments of the invention.

According to an advantageous embodiment of the invention which is illustrated in FIG. 4, streaming wall 3 has, in the vicinity of its through-orifice 4, a conical part $3_1$, ending up at the through-orifice 4, having a shape converging downwardly, and ending up at said through-orifice 4 to be connected to the connecting channel forming the connecting means 9 with a downwardly diverging shape. This conical part $3_1$, which extends streaming wall 3, increases efficiency by increasing the speed of the gas at the level of orifice 4.

Figure 5:
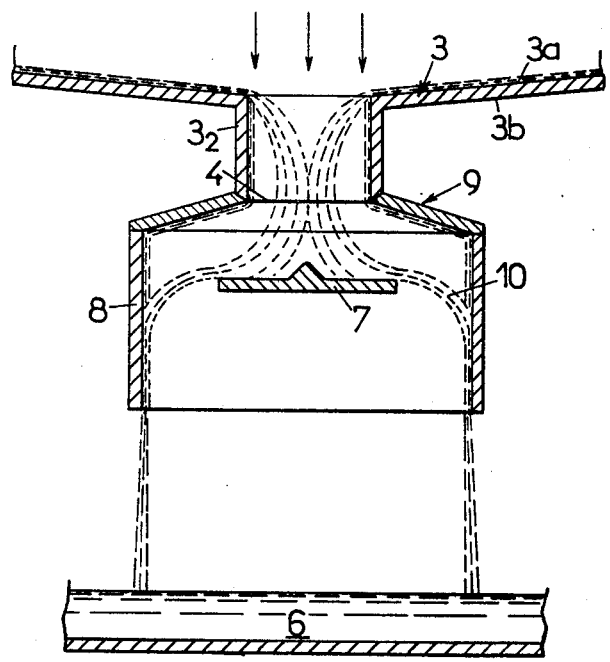

If reference is now made to the embodiment illustrated in FIG. 5, streaming wall 3 has, in the vicinity of its through-orifice 4, a cylindrical part $3_2$ whose lower end forms said through-orifice 4 and is connected to the connecting channel forming connecting means 9 with a downwardly diverging shape.

This arrangement, which consists in providing a cylindrical part $3_2$ extending the streaming wall 3 and forming a chimney, improves the collecting efficiency by increasing the contact time between the paint and the washing liquid.

Figure 6:
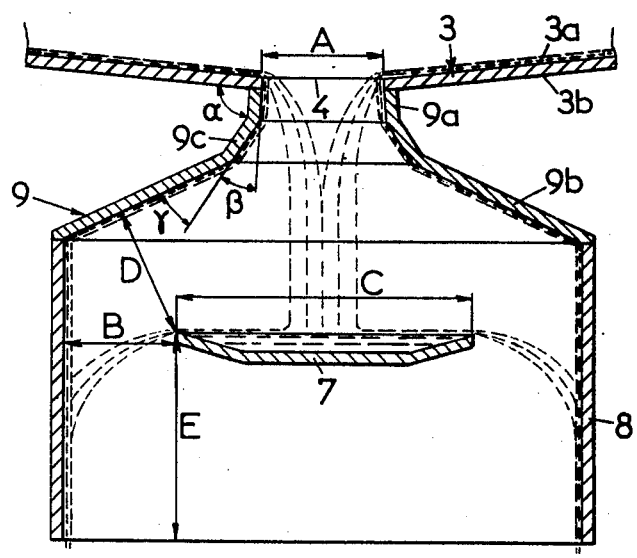

The embodiment illustrated in FIG. 6 is an improved variation of the embodiment illustrated in FIG. 1;

This improvement relates essentially to the geometry of the connecting channel forming connecting means 9.

In fact, dimension A of through-orifice 4 and dimension B of the spacing between the edge of transverse wall 7 and streaming wall 8 must be determined with respect to the following parameters;

- delivery rate of the gas passing through the washing device,
- delivery rate of the washing liquid,
- average speed of the gas in through-orifice 4,
- shape and arrangement of transverse wall 7,
- pressure drop between the inlet and the outlet of the washing device.

These dimensions A and B must be chosen so that the best washing efficiency is obtained for a small amount of washing liquid carried along and for a minimum pressure drop in the gas flow.

Other characteristic dimensions are to be taken into consideration.

They are,

- the transverse dimension C of transverse wall 7,
- the minimum distance D existing between connecting means 9 and the peripheral edge of transverse wall 7,
- and distance E existing between the peripheral edge of transverse wall 7 and the lower end of streaming wall 8.

To optimize the operation of the washing device it is advantageous, as shown in FIG. 6, to give to the connecting channel forming connecting means 9 a downwardly diverging shape whose divergence increases from top to bottom.

Connecting means 9 which are thus formed and shown in FIG. 6 are constituted,

- by an upstream part 9a connected to streaming wall 3 at orifice 4,
- by a downstream part 9b connected to streaming wall 8 at its upper end,
- and by an intermediate part 9c connecting the upstream part 9a to the downstream part 9b.

The whole of these parts 9a, 9c and 9b form a connecting channel 9 with an optimum diverging shape.

This particular shape of connecting means 9 is further characterized by the following parameters:

- angle $\alpha$ between streaming wall 3 and the upstream part 9a of connecting means 9,
- angle $\beta$ between the upstream part 9a and the intermediate part 9c of connecting means 9,
- angle $\gamma$ between the intermediate part 9c and the downstream part 9b of connecting means 9.

This being so, it should be pointed out that, dimension C must be greater than or equal to twice dimension A so as to ensure correct deflection of the washing liquid, distance D must be greater than or equal to distance B so that the pressure drop is not increased by the presence of the connecting means, distance E must be greater than or equal to one and a half times distance B so that streaming wall 8 efficiently fulfills its function, i.e. that the stream of washing liquid is maintained flat against this streaming wall so as to reduce the washing liquid carried along by the gas stream.

Angle $\alpha$ must be greater than or equal to 60° and angles $\beta$ and $\gamma$ must be less than 40°.

Insofar as this last relation between the angles is concerned, a similar relation must be maintained if the connecting means are formed by a continuous connecting channel, i.e. with a downwardly diverging shape of regular geometry; in this case, the curve of the wall of the connecting channel must be such that the change-of-slope is less than 40°.

Figure 7:
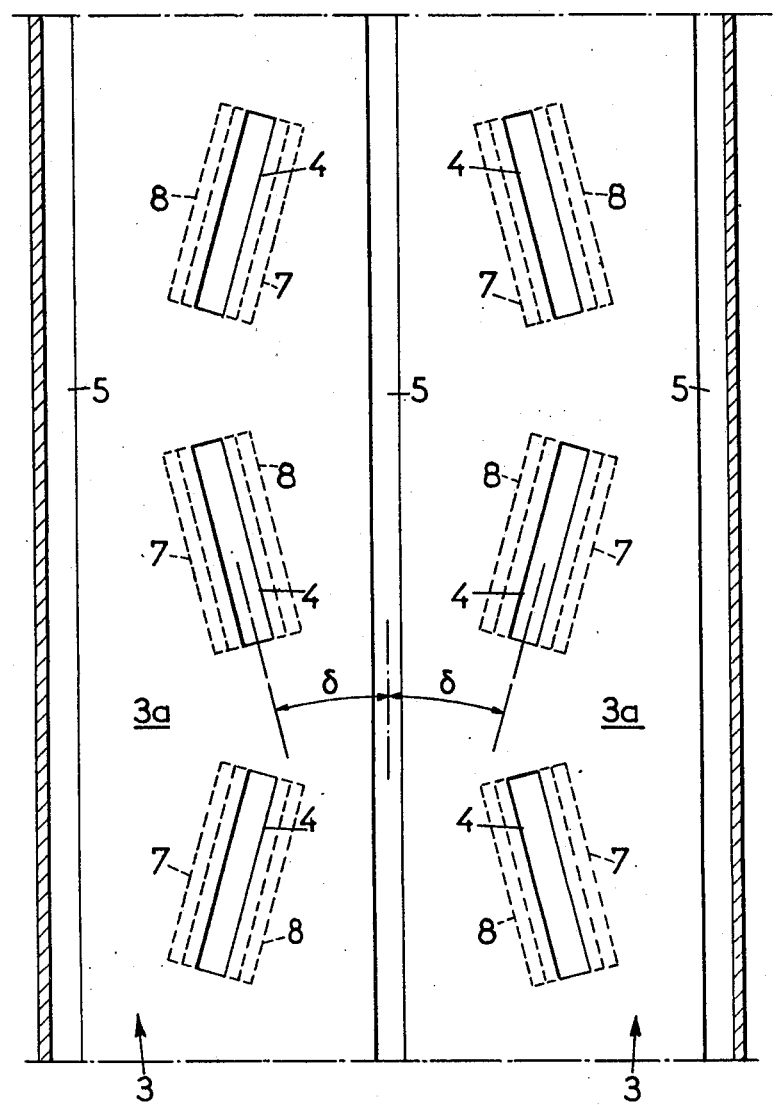
FIG. 7 shows, under the same conditions as in FIGS. 2 and 3, a painting cabin constructed in accordance with a variation of the invention.

According to a variation of the invention illustrated in FIG. 7, in which the same reference figures designate the same parts as in FIGS. 1 to 3, the painting cabin comprises two longitudinal rows of washing devices in accordance with the invention.

This arrangement increases the ventilation of the cabin and its collecting capacity.

It is then advantageous for an additional feed channel to be situated between the two rows of washing devices to ensure a more even supply for the upper side 3a of streaming walls 3.

Two rows of rectangular washing devices in accordance with the invention may also be used but by placing each device in the same row so that orifice 4 has a longitudinal axis forming an angle of slope $\delta$ with respect to the longitudinal axis of the cabin.

Advantageously, the slopes $\delta$ of the longitudinal axes of the washing devices may be reversed from one device to the other in the same row.

Furthermore, the washing devices of the two rows may be disposed symmetrically with respect to each other and with respect to the longitudinal axis of the cabin.

We claim:

1. In a washing device for washing a polluted gas comprising means for causing the polluted gas to flow downwardly in the device from top to bottom, means for causing a washing liquid to continuously flow down an upper face of a washing surface of the device, said washing surface having at least one orifice through which both gas and liquid flow out downwardly, said device further comprising at least one transverse wall centered in said device below said orifice and means defining a channel having a vertical axis and vertical walls, the vertical walls of said channel surrounding said transverse wall, the improvement wherein said channel opens downwardly and the upper end of said channel is connected in a fluid-tight manner to said orifice of said washing surface by means defining a diverging surface which cooperates with said washing surface to form a continuous surface.

2. A washing device as claimed in claim 1, wherein the divergence of said diverging surface increases from the top to the bottom thereof.

3. A washing device as claimed in claim 2, wherein said diverging surface is formed by an upstream part connected to the washing surface orifice, the angle between said upstream part and said washing surface being equal to or greater than 60°, by a downstream part connected to the channel at the upper end thereof, and by an intermediate part connecting the upstream part and the downstream part, the angle between said intermediate part and said upstream part, and the angle between said downstream part and said intermediate part being less than 40°.

4. A washing device as claimed in claim 2, wherein said upstream divergent shaped part is formed by a continuous channel of downwardly diverging regular geometry.

5. A washing device according to claim 1 in which A is the lateral dimension of the orifice of the washing surface, B the spacing between the edge of the transverse wall and the channel, C the lateral dimension of the transverse wall, D the minimum distance existing between the divergent upstream shaped part and the edge of the transverse wall, and E the distance between the edge of the transverse wall and the lower end of the channel, and wherein: C is greater than or equal to twice A so as to ensure correct deflection of the washing liquid, D is at least equal to B so that the pressure drop is not increased by the presence of the divergent upstream shaped part, E is at least equal to one and a half times distance B so that the stream of washing liquid is maintained flat against the channel so as to reduce the amount of washing liquid carried along by the gas stream.

6. In a paint installation cabin having at least one washing device, said at least one washing device being constructed in accordance with claim 1.

7. An installation as claimed in claim 6, wherein said at least one washing device comprises two longitudinal rows of washing devices.

8. An installation as claimed in claim 7, further comprising washing liquid feed means which comprise a supply channel situated between the two longitudinal rows of washing devices.

9. An installation as claimed in claim 7 or 8, wherein the washing devices of the two rows are of rectangular shape and are disposed so that each device in the same row has a longitudinal axis which slopes with respect to the longitudinal axis of the cabin.

10. An installation as claimed in claim 9, wherein the angle of slope of the longitudinal axes of the washing devices in the same row is different from one device to the next in that row.

* * * * *